3,150,142
CYANOETHYLATION PROCESS
Charles J. Eby, N. Springfield, Va., assignor to Monsanto Company, a corporation of Delaware
No Drawing. Filed June 5, 1961, Ser. No. 114,669
7 Claims. (Cl. 260—289)

The invention relates to a new and improved process for monocyanoethylating ketones involving the use of new catalysts.

It is known to react ketones with acrylonitrile in the presence of strongly alkaline catalysts such as alkali metal, alkali metal hydroxides, alkali metal cyanides, quaternary ammonium bases or cross-linked polyquaternary ammonium bases, producing ketones cyanoethylated in the α-position to the carbonyl group. The process using the strongly basic catalyst is usually strongly exothermic necessitating special precautions for the removal of heat of reaction. Furthermore, when the ketones contain several equally activated hydrogen atoms in α-position to the carbonyl group it is generally not possible to obtain substantial quantities of monocyanoethylated ketones. One process for preferentially monocyanoethylating ketones in the α-position to the carbonyl group is described in U.S. 2,850,519 and this process involves carrying out the reaction in the presence of primary amines in a pH range of 5–12.

New catalysts have now been found which preferentially produce monocyanoethylation of ketones and these new catalysts are metal salts of organic carboxylic acids. The metal salts which are suitable are copper, cobalt, nickel, silver, zinc, lead, manganese, cadmium and iron salts of organic carboxylic acids.

It is an object of this invention to provide a new and improved process for monocyanoethylating ketones in the α-position to the carbonyl group.

These and other objects of the invention will become apparent as the detailed description of the invention proceeds.

According to the invention, acrylonitrile is reacted or condensed in the presence of catalytic amounts of certain metal salts of organic carboxylic acids with a ketone having at elast one hydrogen atom on an α-carbon atom to the carbonyl group. The monocyanoethylated ketone products can be cyclized to yield lactams. Preferred carboxylic acids have from 1 to 18 carbon atoms. Suitable metal salts are those of copper, cobalt, nickel, silver, zinc, lead, manganese, cadmium, and iron.

Metal salts of either aliphatic or aromatic hydrocarbon carboxylic acids are useful in the process of the invention. Illustrative examples of useful catalysts which are salts of alkanoic acids are the following: cupric, cuprous, cobaltic, cobaltous, nickelic, nickelous, silver, zinc, plumbous, plumbic, manganous, manganic, cadmium, ferrous or ferric acetate, n-propionate, isopropionate, n-butyrate, isobutyrate, t-butyrate, n-octoate, 2-ethylhexoate, laurate, palmitate, stearate, etc. In general the longer chain alkanoic acids having from 4 to 18 carbon atoms are preferred to make the metal salt catalysts which are more soluble in the reaction mixtures. Alternatively or in admixture with the metal salt catalysts of the alkanoic acids, salts of the same metals with aromatic hydrocarbon carboxylic acids can be used as catalysts in the process of the invention and an illustrative listing is as follows: cupric, cuprous, cobaltic, cobaltous, nickelic, nickelous, silver, zinc, plumbous, plumbic, manganous, manganic, cadmium, ferrous or ferric benzoate, 4-toluate, phthalate, naphthoate, etc. It is preferred that the catalysts not contain aliphatic (olefinic or acetylinic) unsaturation to reduce side reactions and undesirable by-products.

The process of the invention is applicable to a wide variety of ketones, R′COR″, where R′ and R″ are the same or different hydrocarbon radicals. An illustrative list of suitable ketones for the reaction are the following: aliphatic ketones-acetone, methylethyl ketone, methylpropyl ketone, diethyl ketone, methyl-isopropyl ketone, methylisobutyl ketone, methylheptyl ketone, acetyl ketone or acetonyl acetone; cycloaliphatic ketones which are especially desirable reactants such as cyclopentanone, cyclohexanone, 2-methylcyclohexanone, 4-methylcyclohexanone, cycloheptanone, 1- or 2-oxo-decahydronaphthalene, cyclohexanedione-(1,2), cyclohexanedione-(1,4); and mixed aliphatic-aromatic ketones such as acetophenone, propiophenone, or 1- or 2-oxo-tetrahydronaphthalene, etc. Preferred ketones for the reaction are those containing not more than 18 carbon atoms. It is preferred that the ketones not contain aliphatic (olefinic or acetylinic) unsaturation to reduce side reactions and undesirable by-products.

According to the invention, the cyanoethylated ketones are prepared by simply mixing the ketone with the acrylonitrile in the presence of the metal carboxylate catalyst and allowing the resulting reaction mixture to stand at room temperature; however, the reaction will proceed extremely slowly at room temperature so normally the reaction mixture will be heated to a temperature in the range of 75–300° C., preferably 100–250° C. until the cyanoethylation is completed. Depending upon the nature of the individual ketone and of the particular catalyst used the cyanoethylation reaction can occur under varying conditions of temperature and pressure. Depending on the temperature, the ketone and the catalyst, reaction times can vary from a few minutes to a number of days; however, normally the reaction time will be from a few hours to 24 hours. The reaction can be effected at ordinary, atmospheric, sub-atmospheric or super-atmospheric pressure and in the presence or absence of an inert diluent or solvent. The quantity of the metal carboxylate salt present will be in the order of catalytic amount, e.g., from 0.01 percent to 10 percent by weight of the ketone reactant. Since monocyanoethylation is desired, equal molar amounts of the ketone and acrylonitrile reactants can be employed in the process; however, if desired, an excess of either reactant can be employed. Normally it is desired to employ an excess of the ketone reactant which tends to favor the monocyanoethylation. Unreacted acrylonitrile or ketone are easily separated by distillation, extraction or other conventional means. In working up the reaction product, I generally operate by first filtering off any insoluble material, extracting the filter cake with, for example, hot benzene to improve product recovery, stripping off volatiles under water aspirator vacuum at temperatures of up to about 50° C., and fractionating the remaining residue product under high vacuum of about 0.1 mm. or higher to recover the desired product or products. As an alternative to the fractionation step, fractional crystallization or solvent extraction can be used to purify the reaction mixture and recover the desired product.

In the process of the invention, rather than acrylonitrile certain other reactants such as ethyl acrylate, methyl vinyl ketone, and acrylamide can be condensed with ketones such as cyclohexanone. The resulting product then rather than having a —CH$_2$CH$_2$CN radical will have a

—CH$_2$CH$_2$COOC$_2$H$_5$ a —CH$_2$CH$_2$COCH$_3$ or a —CH$_2$CH$_2$CONH$_2$ radical substituted on an α-carbon atoms of the ketone and cyclized products can also result analogous to the formation of lactams when acrylonitrile is used.

The invention is further illustrated but not limited to the following examples:

A typical ketone cyanoethylation is described below. The equipment used is a 1.4 liter bottom-stirred autoclave equipped with a liquid inlet tube, a combination gas inlet and vent, an automatically recording thermocouple, an electric heating jacket, a water cooling coil and an air cooling jacket. In some runs the bomb is purged and pressured with nitrogen.

To the 1.4 liter bottom-stirred autoclave is added a weighed mixture of 196 g. (2.0 moles) of cyclohexanone, 106 g. (2.0 moles) of acrylonitrile, 300 ml. of benzene and an amount of metal salt that contains 0.05 g. atom of the metallic cation. The bomb is sealed and heated to 150° C. and the contents heated and stirred for 12 hours (overnight). At the end of this period, the heaters are turned off and both water and air coolers turned on. In the morning, the bomb is opened, the contents are removed and weighed. An aliquot sample is withdrawn for vapor phase chromatographic (VPC) analysis. When the reaction mixture is worked up, the solid is removed by vacuum filtration and extracted with hot benzene. The extracts are combined with the filtrate, the volatiles are removed on a solvent stripper by means of a water aspirator up to a pot temperature of 50° C./40 mm., the pot is transferred to a 10″ Vigreux column and the contents fractionally distilled to give cyclohexanone, B.P. 45–50° C./17 mm., $n_D^{25}$ 1.4478 and 2-($\beta$-cyanoethyl)-cyclohexanone, B.P. 95–100° C./0.1 mm., $n_D^{25}$ 1.4689–1.4728. The residue from the distillation is subjected to crystallization using acetone or benzene-hexane solvents, and a lactam product which is hexahydrocarbostyril, M.P. 146.5–148° C. is recovered.

The actual experimental examples are summarized in Tables I and II below. Table I summarizes the runs in which the ketone was cyclohexanone and Table II summarizes the runs in which different ketones were used.

versus the lactam product is shown in another column of the tables. Two different methods of product analysis were used in the examples as indicated in Table I, one method being vapor phase chromatography (VPC) and the other the workup method, which is described in detail in the detailed description of the experimental procedure above. No attempt was made to maximize conversions to monocyanoethylated products by adjusting reaction conditions, ratio of reactants, etc. otherwise the conversions undoubtedly would have been higher in at least some instances. In general higher temperatures at least about 150° C., preferably in excess of 175° C., and/or longer reaction time seem to favor cyclization of the monocyanoethylated product to the lactam product. It should be noted that the octoate catalysts in the examples of the tables were 2-ethylhexoates.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. In a process for cyanoethylating ketones by condensing acrylonitrile with a ketone having at least one hydrogen atom on a carbon atom adjacent the carbonyl group of the ketone, the improvement wherein the condensation is carried out in the presence of a catalyst selective to monocyanoethylation selected from the group consisting of copper, cobalt, nickel, silver, zinc, lead, manganese, cadium and iron salts of alkanoic monocarboxylic acids having not more than 18 carbon atoms, at a temperature in the range of 75–300° C., and cyanoethylated product is separated from the reaction mixture.

2. A process of claim 1 wherein said ketone is cyclohexanone.

3. A process of claim 2 wherein said catalyst is cupric 2-ethylhexanoate.

Table I

| Metal salt catalyst | Ex. No. | Monocyanoethylation | | Keto-nitrile/lactam | Pot residue, percent | Run temp., ° C. | Run time, hours | Method of analysis |
|---|---|---|---|---|---|---|---|---|
| | | Conv., percent | Yield, percent | | | | | |
| Cupric octoate | 1 | 42 | 89 | 14/86 | — | 150 | 12 | VPC.* |
| | | 35 | 55 | 33/67 | 43 | 150 | 12 | Workup. |
| Do | 2 | 36 | 51 | 53/47 | 29 | 150 | 12 | Do. |
| Cupric acetate | 3 | 30 | 43 | *47/53 | — | 95–165 | 26 | Do. |
| Do | 4 | 30 | 40 | *47/53 | — | 150 | 15 | Do. |
| Cobaltic octoate | 5 | 53 | 78 | 47/53 | — | 150 | 10 | VPC. |
| Cobaltic acetate | 6 | 14 | 50 | 100/0 | 0 | 150 | 13 | Workup. |
| Ferric octoate | 7 | 51 | 86 | 72/28 | — | 150 | 12 | VPC. |
| Nickelic octoate | 8 | 21 | 56 | 88/12 | 0 | 150 | 12 | Workup. |
| Do | 9 | 12 | 57 | 80/20 | — | 150 | 10 | VPC. |
| Zinc octoate | 10 | 33 | 100 | 80/20 | — | 150 | 12 | VPC. |
| Plumbous octoate | 11 | 22 | 100 | 95/5 | — | 150 | 12 | VPC. |
| Silver octoate | 12 | 20 | 100 | 100/0 | — | 150 | 12 | VPC. |
| | | 23.5 | 94 | 83/17 | 11 | 150 | 12 | Workup. |
| Do | 13 | 17 | 22 | 0/100 | — | 220 | 12 | VPC. |
| Cadmium octoate | 14 | 34 | 51 | 27/73 | — | 150 | 12 | VPC. |

* VPC – Vapor phase chromatographic.

Table II

| Ex. No. | Ketone | Metal salt catalyst | Monocyanoethylation | | Keto-nitrile/lactam | Pot residue, percent | Run temp., ° C. | Run time, hrs. |
|---|---|---|---|---|---|---|---|---|
| | | | Conv., percent | Yield, percent | | | | |
| 15 | Acetone | Cupric acetate | 4 | — | 100/0 | — | 150 | 12 |
| 16 | do | Cobaltic octoate | 15 | — | 50/50 | — | 150 | 12 |
| 17 | do | Cadmium octoate | 14 | — | 50/50 | 25 | 150 | 12 |
| 18 | Acetophenone | Cupric acetate | 2 | 8 | 100/0 | 20 | 150 | 12 |

In Tables I and II above "Conv., percent" represents total percent by weight of monocyanoethylation based on ketone charged including monocyanoethylated product cyclized to lactam. Yield, of course, is based on a material balance of reactants charged and products recovered. The weight ratio of monocyanoethylated product 4. A process of claim 2 wherein said catalyst is cobaltic 2-ethylhexanoate.

5. A process of claim 2 wherein said catalyst is ferric 2-ethylhexanoate.

6. A process of claim 1 wherein the temperature is in excess of about 175° C., said ketone is cyclohexanone, and the time is sufficient to cause cyclization of at least a portion of the cyanoethylated product to produce lactam, and lactam is separated from the reaction mixture.

7. A process of claim 6 wherein said ketone is cyclohexanone and said catalyst is cupric 2-ethylhexanoate.

References Cited in the file of this patent

Bergmann: "Acetylene Chemistry," page 80 (1948).
Bruson: "Organic Reactions," volume 5, 1949, pages 86 and 99.